INVENTOR.
EVERETT T. WILBUR
BY William D. Hall
ATTORNEY

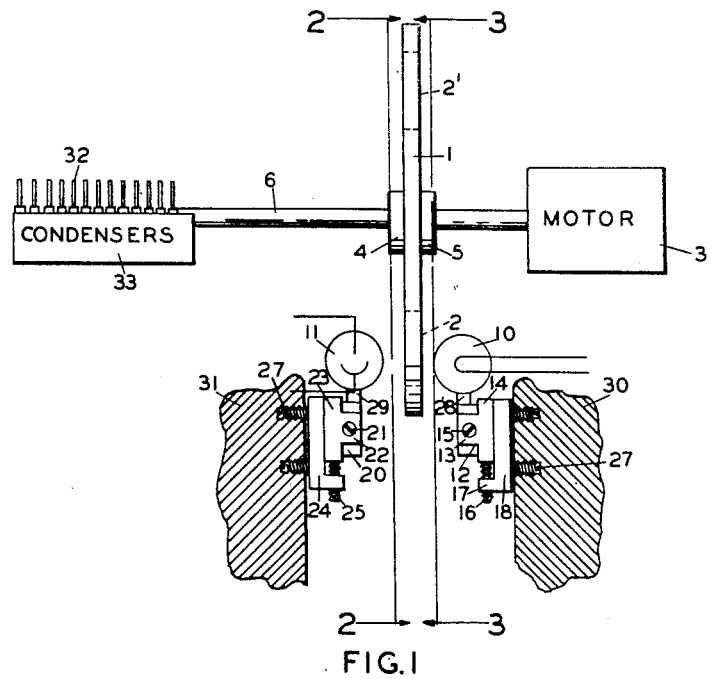
FIG.1
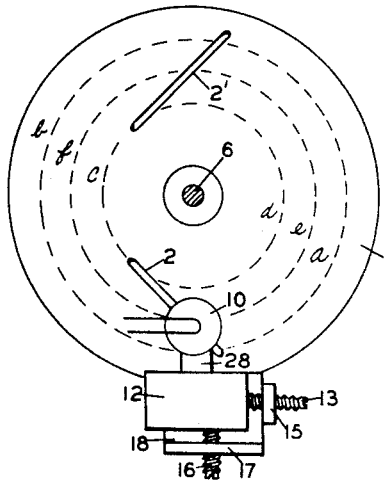
FIG.2
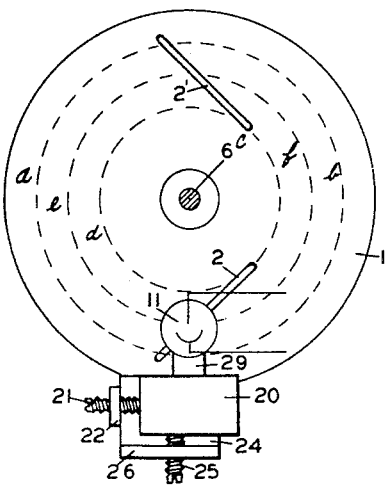
FIG.3
FIG.2A
$a < b$
$c < d$
$e = f$
INVENTOR.
EVERETT T. WILBUR
BY William D. Hall
ATTORNEY July 11, 1950  E. T. WILBUR  2,514,433
TRIGGER DEVICE Filed Feb. 8, 1945  4 Sheets-Sheet 2

July 11, 1950 E. T. WILBUR 2,514,433
TRIGGER DEVICE
Filed Feb. 8, 1945 4 Sheets-Sheet 3

INVENTOR.
EVERETT T. WILBUR
BY William D. Hall
ATTORNEY

July 11, 1950      E. T. WILBUR      2,514,433
TRIGGER DEVICE

Filed Feb. 8, 1945      4 Sheets-Sheet 4

INVENTOR.
EVERETT T. WILBUR
BY William D. Hall
ATTORNEY

Patented July 11, 1950

2,514,433

UNITED STATES PATENT OFFICE 2,514,433

TRIGGER DEVICE

Everett T. Wilbur, Miamisburg, Ohio

Application February 8, 1945, Serial No. 576,872

4 Claims. (Cl. 171—97)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a triggering device for controlling the angular or temporal relationship of impulses within a cyclical series.

The objects of the present invention comprise the provision of an improved type of triggering device that simultaneously varies the phase relationship of a cyclical series with that of an electrical, mechanical, or other device with which it may be coupled; provides a device wherein the variation in phase relationship may operate to compensate for imperfections in other components in a system of which it forms a part; and provides a device which may be adjusted during the time its associated equipment is in continuous operation.

With the above and other objects in view that will be apparent to those who are informed in the field of triggering devices from the following description, suitable embodiments of the present invention are shown in the accompanying drawings, wherein:

Fig. 1 is an elevational and block diagram view of an assembly that embodies the present invention;

Fig. 2 is an elevational view taken from the line 2—2 in Fig. 1 looking in the direction that is indicated by the arrows;

Fig. 2a is a simplified tabulation, explanatory of changes in operating effects of my improved device, brought about by adjustment of certain parts thereof;

Fig. 3 is an elevational view taken from the line 3—3 in Fig. 1 looking in the direction that is indicated by the arrows;

Figure 4:
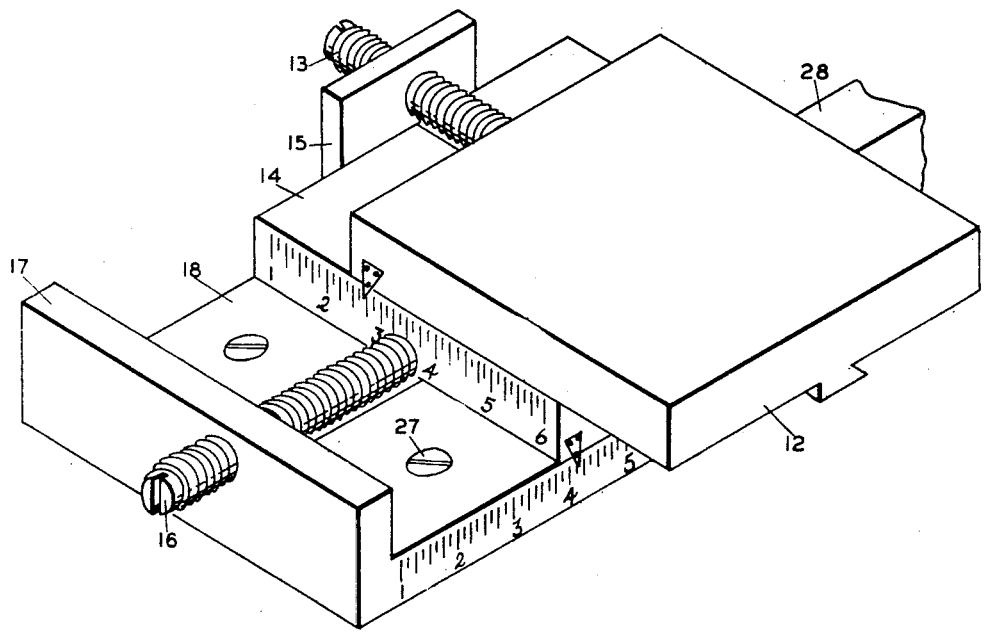
Fig. 4 is a perspective view of a calibrated adjustable component supporting part of the device that is shown in Fig. 1.

The first form of triggering device that is illustrated in the accompanying drawings comprises an opaque disc 1 that is apertured in any desired number of narrow slots 2, 2′, etc., that extend in angular relation with respect to radii of the disc 1. The slots 2, 2′, etc. are sufficiently inclined with respect to the radii of the disc 1 so that the dash line outer arc $a$ is less than the arc $b$, the inner arc $c$ is less than the arc $d$, and the intermediate arc $e$ is equal to the arc $f$. This relation of arc-lengths is tabulated in Fig. 2a. The disc 1 is power driven in any desired manner, as by a motor 3, and is mounted between supporting blocks 4 and 5 upon the shaft 6 thereof. A light source 10 continuously emits light rays that energize a light-sensitive element in a photoelectric tube 11 thru the slot 2, or 2′, of the disc 1 when a slot is interposed between the light source 10 and the tube 11 during the rotation of the disc 1. The unslotted portions of the opaque disc 1 interrupt light rays that are directed toward the photoelectric tube 11 from the light source 10 and prevent the triggering of the tube 11.

The light source 10 preferably is adjustably mounted for both radial and tangential movement with respect to the disc 1 in any desired manner, as by operation of an adjustable component supporting device that is shown therebelow and also in Fig. 4 of the drawings. The light source 10 preferably is mounted upon a stem part 23 of a slide part 12 of the component supporting device, and is moved tangentially of the disc 1 by operation of a screw 13. The slide 12 is movably dovetailed upon another slide 14 that carries a flange 15 thru which the screw 13 threads, as shown in perspective in Fig. 4 of the drawings. The slide 14 is adjustable radially of the disc 1 by operation of a screw 16. The screw 16 threads thru a flange part 17 of a rigidly mounted base plate 18 with which the slide 14 is dovetailed. In this manner the position of the light source 10 is adjustable tangentially of the disc 1 by operation of the screw 13 and radially of the disc 1 by operation of the screw 16. The adjustable support that is so provided preferably is calibrated for linear movement as shown in Fig. 4 and permits the accurate adjustment of the light source 10 with respect to the inclined slots 2 and 2' in the rotatable disc 1, where a pin point light source is preferred. Where the light source 10 is not shielded, it may be permanently mounted in any suitable manner.

The photoelectric tube 11 in a similar manner is adjustably mounted for a desired alignment with respect to the inclined slots 2 and 2' in the disc 1. A preferred mounting for the photoelectric tube 11 is substantially an inverted duplication of the mounting for the light source 10. The photoelectric tube 11 is mounted upon a stem part 29 of a slide 20 that is moved tangentially of the disc 1 by a screw 21. The screw 21 threads thru a flange portion 22 of another slide 23 with which the slide 20 is dovetailed, and that in turn is movably dovetailed to a base plate 24. The slide 23 is moved radially of the disc 1 by operation of a screw 25. The screw 25 threads thru a flange portion 26 of the base plate 24. Screws 27 serve to secure firmly the base plates 18 and 24 to any suitable rigid supports 30 and 31, respectively.

The motor 3 preferably also serves to continuously variably tune the panoramic sweep of a radio receiver circuit by continuously rotating a plurality of variable condenser plates 32, that are mounted upon the motor shaft 6, thru a plurality of fixed condenser plates 33 that comprise a split-stator tuning condenser or the like. The continuously variable capacitor, comprising the moving plates 32 and the fixed plates 33, provides a continuous sweep for the tuning of a panoramic receiver, or the like.

Figure 5:
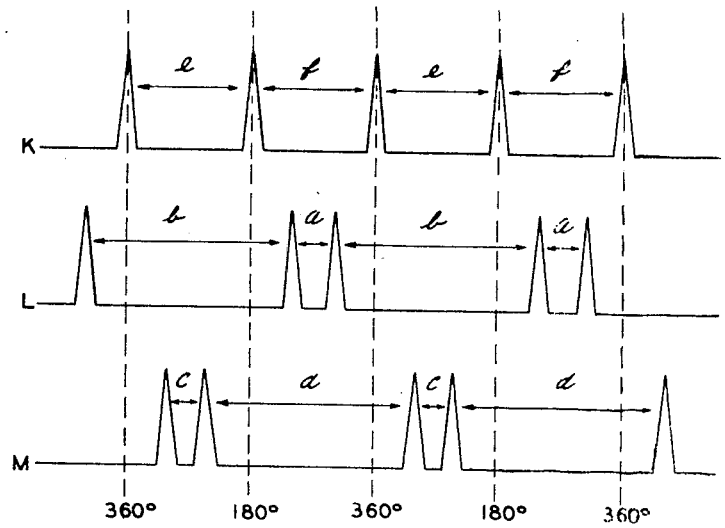
Fig. 5 is a diagram of pulse signals that are emitted by the present device over its full range in sequence effected by radial displacement only of the photoelectric tube.

Control pulse sequences effected by the adjustment of the photoelectric tube 11 radially only of the disc 1, are represented in Fig. 5 of the accompanying drawings.

Figure 6:
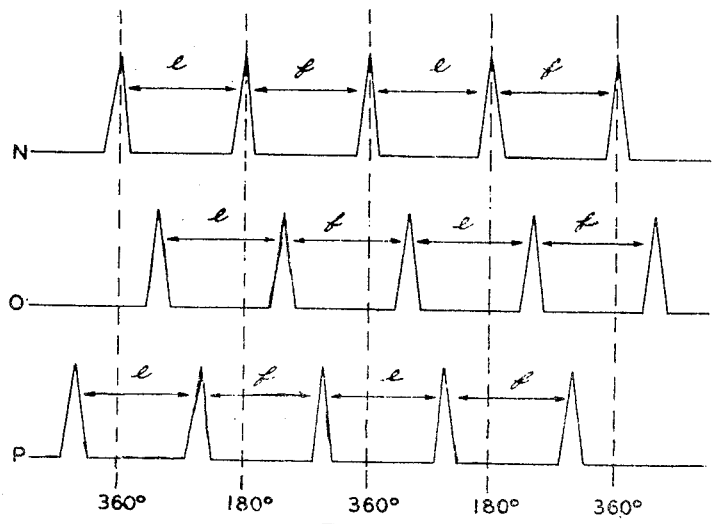
Fig. 6 is a diagram of pulse signals from the device in sequence effected by tangential displacement only of the photoelectric tube.

Control pulse sequences effected by the adjustment of the photoelectric tube 11 tangentially only of the disc 1, are represented in Fig. 6 of the accompanying drawings.

The normal pulse sequence, when the photoelectric tube 11 is disposed substantially at the arcs $e$ and $f$ that are midway between the radial inner and outer ends of the slots 2, 2' etc., in the disc 1, and where the arcs $e$ and $f$ are of equal length, is represented in the pulse sequence K of Fig. 5. As shown in the pulse presentation K, the pulses are equidistant from each other, i. e., are spaced equally from each other in point of time.

The pulse sequence when the photoelectric tube 11 is disposed at the radially outer ends of the slots 2, 2' etc., in the disc 1, or on the arcs $a$ and $b$, is represented as the pulse sequence L in Fig. 5. In this pulse sequence L, since the arc $a$ is of shorter length than the arc $b$, and since the rate of rotation of the disc 1 is uniform in point of time, the arc $a$, with the photoelectric tube 11 as reference point, is traversed in a shorter elapsed time interval than is the arc $b$. In harmony with this concept, the time and distance $a$ on the pulse sequence presentation L is shorter than the time and distance $b$, and also is shorter than the linear arc time and distance $e$, or its equal, the linear arc time and distance $f$. Since the disc 1 rotates continuously at a uniform rate thru a full turn, or thru 360°, the difference in elapsed time between the travel time over the arc $a$ and the travel time over the arc $f$, or its equal the arc $e$, is equal to, but is of opposite sign to, the difference in elapsed time between the travel time over the arc $b$ and the travel time over the arc $e$, or on a time basis:

$$a+b=e+f=2e$$

or $$b-e=f-a$$

The pulse sequence when the photoelectric tube 11 is disposed at the radially inner ends of the slots 2, 2', etc., in the disc 1, or on the arcs $c$ and $d$, is represented as the pulse sequence M in Fig. 5. In this pulse sequence and on a time basis, in a similar manner:

$$c+d=e+f=2e$$

or $$e-c=d-f$$

since the arc $c$ is traversed in a shorter period of time than is the arc $e$ and the arc $d$ is traversed in a greater period of time than is the arc $f$, where the photoelectric tube 11 is moved radially only of the disc 1.

It will thus be noted that the radial movement only of the photoelectrical tube 11, as represented by the vertical line R in Fig. 2a, adjusts the time duration between adjacent pulses in alternate 180° arcs. When th time duration is adjusted at one extreme, the arc may be made appreciably less than 180°, and at the other extreme the same arc may be made appreciably greater than 180°. An increase in one arc is accompanied by a decrease in the diametrically opposite arc.

The pulse sequence when the photoelectrical tube 11 is moved tangentially only of the disc 1, as represented by the horizontal line T in Fig. 2a, is shown in Fig. 6. In this presentation the radial distance between the center of the disc 1 and the tube 11 remains substantially constant for tangential changes in position of the tube 11. In this presentation, tangential movements only of the tube 11 shifts the phase of the pulse sequence series.

The pulse sequence, when the photoelectric tube 11 is disposed at the radius of the arc $e$ or $f$, and is moved tangentially toward the pulse-delaying or radially-outer end of the slots 2, 2', etc., is delayed in point of time, as represented in the pulse sequence presentation O, as compared with the normal reference presentation N in Fig. 6. The reference presentation N in Fig. 6 is the same as the reference presentation K in Fig. 5.

The pulse sequence, when the photoelectric tube 11 is moved tangentially from the midline of the slot 2 or 2' toward the earlier or radially-inner end of one of the slots, is represented in the pulse sequence presentation P in Fig. 6. In this presentation P, the pulse sequence is early in point of time as compared with the reference presentation N. In general, the tangential movement only of the photoelectric tube 11 shifts the phase of the series with respect to a fixed point upon the disc 1.

The present device serves to effectually compensate for electrical irregularities that arise out of physical imperfections in split-stator tuning condensers, the presence of electrical fields about the condenser, or the like. The device compensates for errors that arise out of the discrepancy between electrical and mechanical degrees in the tuning of variable condensers as used in panoramic and other radio receivers. The device permits accuracy in aligning the number of electrical degrees that are traversed by diametrically-opposed condenser plates on a split-stator tuning condenser that may arise from mechanical imperfections in the condenser plates and the proximate mounting thereof, or from the inductive effect of electrical apparatus within the electrical field of which the tuning condenser plates are caused to operate. The device may be used in any application wherein it is necessary to compensate for or to determine the degree of discrepancy between successive 180° pulses, or other related recurrent phenomena.

The degree of divergence of each pulse from a true 180° for a given radial adjustment can be controlled by the angle of the slot with respect to the radius of the disc 1. The thinner the slots 2, 2', etc., are made, the more accurate the device is.

In operation, the photoelectric tube 11 is adjusted tangentially and radially with respect to the slots 2 and 2' in the disc 1, by operation of the screws 21 and 25, respectively. This adjustment permits advantage to be taken of the triggering variation upon opposite sides of the dash line arcs e and f on the disc 1. The arcs e and f are of equal length and provide triggering at equal time intervals and in uniform electrical sequence, as indicated in the signal presentation K of Fig. 5 of the drawings. When the photoelectric tube 11 is moved radially outwardly of the disc 1, the electrical sequence along the arc a is shortened and the sequence along the arc b is lengthened, as indicated in the sequence L of Fig. 5. When the photoelectric tube 11 is moved radially inwardly of the disc 1, the electrical sequence is lengthened along the arc d and is shortened along the arc c as indicated in the sequence M of Fig. 5.

The adjustment of the photoelectric tube 11, with respect to the slots 2, 2' etc., in the opaque disc 1, allows for corrections in a device which must be triggered precisely at every electrical 180°. In a situation where it is necessary to compensate for variations in electrical sequence in alternate 180° arcs by the adjustment of the device, any tendency for one arc to be longer than the other can be corrected by the radial adjustment of the photoelectric tube 11.

In the event that it is necessary to shift the whole series of electrical sequence, this result can be achieved by the tangential adjustment of the photoelectrical tube 11. By means of both the radial and tangential adjustment of the photoelectrical tube 11 with respect to the slots 2, 2' etc., in the disc 1, a wide variety of combinations of pulse arrangements can be accomplished.

Figure 7:
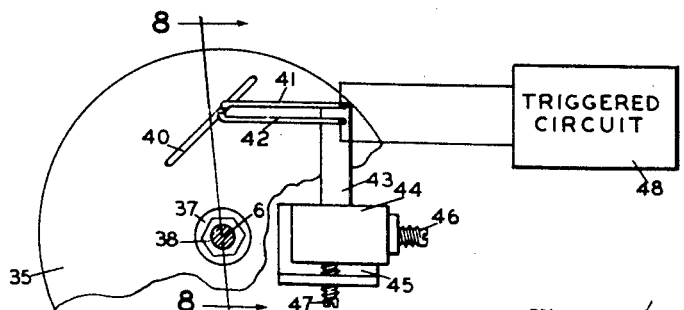
Fig. 7 is a fragmentary elevational view of a mechanical modification of the device that is shown in Figs. 1, 2 and 3.

A mechanical modification of the same invention is shown in Fig. 7 of the accompanying drawings. In this construction, a non-conducting disc 35 is mounted rotatably in a plane that is normal to the motor shaft 6. The disc 35 is disposed at the end of shaft 6, and beyond the condensers 32, 33, and between plates 36 and 37 that are secured by a nut 38 that threads on the end of the motor shaft 6, or the like.

The disc 35 carries one or more conducting strips 40 that are inclined with respect to the radii of the disc 35, in a manner that is similar to the disposition of the slots 2, 2', etc., in the disc 1. Each of the conducting strips 40 engages in wiping contact with each rotation of the disc 35 by wiping brushes on the ends of a pair of spring metal contact arms 41 and 42. The contact arms 41 and 42 are supported by a non-conducting stem 43 that extends upwardly from the top tangential slide 44 of a contact-supporting and adjusting table. The tangential slide 44 is slidably dovetailed to a radial slide 45 which, in turn, is slidably dovetailed to a base plate that is firmly supported as in the previously described constructions. The adjustment of the moveable slides 44 and 45 of the table is controlled by a tangential screw 46 and a radial screw 47 as in the device that is shown in Fig. 4. The contact arms 41 and 42 are in electrical connection with the circuit 48 that is to be triggered. The pair of contacts 41 and 42 are adjustable radially of the disc 35 by operation of the screw 47, and tangentially of the disc 35 by operation of the screw 46, so that the brush ends of the pair of contacts 41 and 42 may be moved along substantially the full length of the contact strip 40. The electrical sequence of the contact is shortened along the arc a when the brush contact ends of the pair of arms 41 and 42 are moved radially outwardly of the disc 35, and lengthened along the arc b when the contacts are moved radially inwardly of the disc. The disc 35 is non-conducting, and hence circuit between the arms 41 and 42 is only completed when the brush ends thereof are in simultaneous electrical contact with one of the conducting strips 40.

Figure 10:
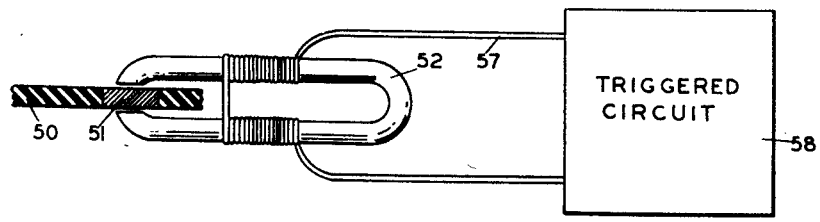
Fig. 10 is an enlarged section taken along the line 10—10 of Fig. 9.
Figure 9:
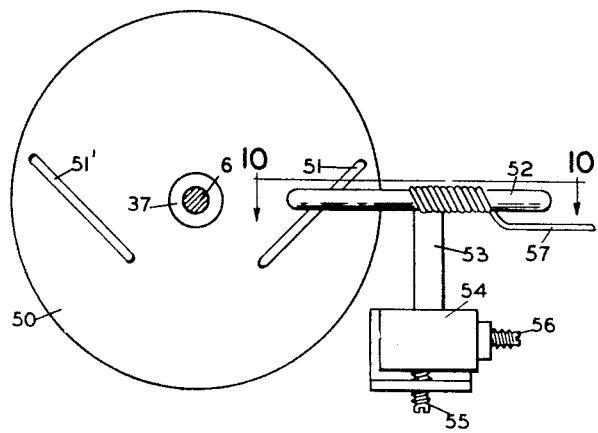
Fig. 9 is an elevational view of another modification in the device that is shown in Figs 1, 2 and 3.

A further modification in the present invention is shown in Figs. 9 and 10 of the accompanying drawings. In this construction, a disc 50 of non-magnetic material has embedded therein a desired plurality of magnetically-conducting armature strips 51, 51', etc., that are flush with the opposite surfaces of the disc 50 and that are disposed in angular relation with respect to the radii thereof. The disc 50 is mounted upon the motor shaft 6 as is the disc 35, or otherwise as desired.

A U-shaped magnet 52 is adjustably mounted with respect to the disc 50 in any desired manner, and preferably upon a non-conducting stem part 53 of a table slide 54 that is adjustable tangentially of the disc 50 by a screw 55, and radially by a screw 56 so that the spaced free ends of the magnet 52 may be adjustably moved the full length of the armature strips 51, 51', etc., in the disc 50. The legs of the magnet 52 carry a desired number of turns of a continuous wire 57 that terminates in the circuit 58 to be triggered.

In operation, as the disc 50 is rotated by the motor 3, the armatures 51 and 51' pass between the spaced poles of the U-shaped magnet 52 and send a triggering electrical impulse thru the wire 57 to the triggered circuit 58.

Figure 8:
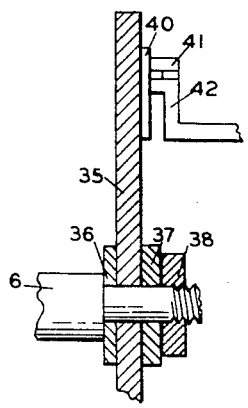
Fig. 8 is an enlarged section taken along the line 8—8 of Fig. 7.
Figure 11:
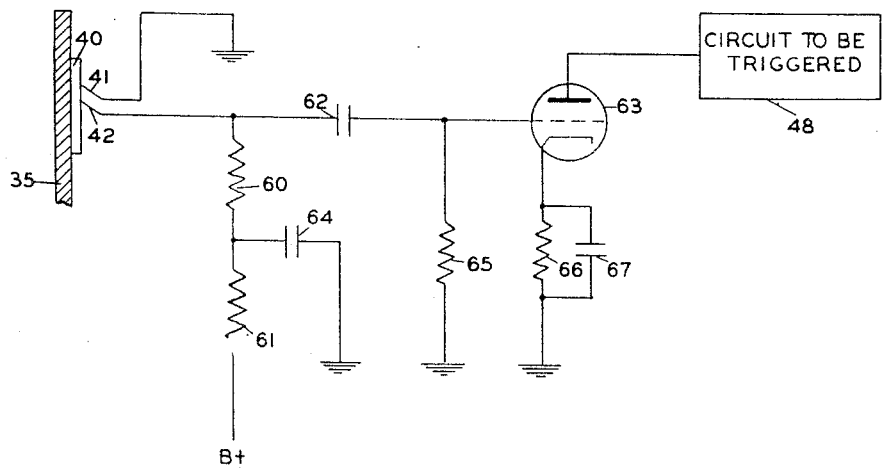
Fig. 11 is an illustrative schematic circuit for being interposed between the device that is contemplated hereby and a circuit to be triggered.

An illustrative circuit between the triggering device shown in Figs. 7 and 8, and the circuit to be triggered, is shown in Fig. 11 of the accompanying drawings. In this circuit the brushes 41 and 42 are positioned to contact substantially simultaneously the conducting strips 40 on the non-conducting disc 35. One of the contacts 41 is grounded and the other contact 42 is supplied current of a desired sign, such as +B as shown, thru a pair of resistors 60 and 61 and is connected thru a condenser 62 to the grid of a triode 63. The junction of the resistors 60 and 61 is grounded thru a condenser 64. The grid of the tube 63 is grounded thru a resistor 65. The cathode of the tube 63 is by-passed to ground thru a resistor 66 that is shunted by a condenser 67. The plate of the triode 63 supplies amplified triggering signal to the circuit 48.

It is to be understood that the devices and the parts thereof that are disclosed and described herein and the accompanying circuit therefor, have been submitted for the purposes of illustrating and describing suitable, operating embodiments of the present invention and that similarly functioning modifications and substitutions therein may be made without departing from the present invention as defined by the appended claims.

What I claim is:

1. An apparatus for generating a series of spaced electrical pulses comprising a member supported for rotation about a fixed axis, means associated with said member and responsive to the rotation thereof to generate said pulses, and means supporting said first-named means and operable to effect adjustment of the latter with respect to said member in a direction radially of said axis to adjust the time duration between adjacent pulses and in a direction tangentially of certain arcs prescribed by said member during rotation of the same to shift the phase of said series with respect to a fixed point upon said member.

2. In a trigger device of the character described, means for generating a series of spaced electrical pulses, a substantially opaque disc forming part of said means and supported for rotation about a fixed axis, said disc being provided with relatively narrow slots disposed respectively on opposite sides of said axis and inclined with respect to the radii of said disc, a light source and a light-sensitive element disposed respectively on opposite sides of said disc, and means supporting said light source and said light-sensitive element and operable to effect adjustment of the same with respect to said disc in a direction radially of said axis to adjust the time duration between adjacent pulses and in a direction tangentially of certain arcs prescribed by said disc during rotation of the same to shift the phase of said series with respect to a fixed point upon said disc.

3. In a trigger device of the character described, means for generating a series of spaced electrical pulses, a disc forming part of said means and supported for rotation about a fixed axis, said disc being of electrically non-conducting material and provided with conducting strips disposed respectively on opposite sides of said axis and inclined with respect to the radii of said disc, a pair of metallic contact elements, and means supporting said contact elements for wiping contact with said strips with each rotation of said disc to generate said pulses, said supporting means being operable to effect adjustment of said contact elements with respect to said disc in a direction radially of said axis to adjust the time duration between adjacent pulses and in a direction tangentially of certain arcs prescribed by said discs during rotation of the same to shift the phase of said series with respect to a fixed point upon said disc.

4. In a trigger device of the character described, means for generating a series of spaced electrical pulses, a disc of non-magnetic material forming part of said means and supported for rotation about a fixed axis, said disc being provided with magnetically-conducting armature strips embedded therein and substantially flush with the opposite surfaces thereof, said strips being disposed respectively on opposite sides of said axis and inclined with respect to the radii of said disc, a U-shaped magnet associated with and embracing said disc for cooperative operating action with said strips to generate said pulses, and means supporting said magnet and operable to effect adjustment of the latter with respect to said disc in a direction radially of said disc to adjust the time duration between adjacent pulses and in a direction tangentially of certain arcs prescribed by said disc during rotation of the same to shift the phase of said series with respect to a fixed point upon said disc.

EVERETT T. WILBUR.

REFERENCES CITED

The following references are of record in the file of this patent:

UNITED STATES PATENTS

| Number | Name | Date |
| --- | --- | --- |
| 237,632 | Sawyer | Feb. 8, 1881 |